United States Patent
Nago

(10) Patent No.: US 7,426,401 B2
(45) Date of Patent: Sep. 16, 2008

(54) METHOD AND APPARATUS FOR WIRELESS COMMUNICATION BETWEEN DEVICES

(75) Inventor: Hidetada Nago, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 10/713,180

(22) Filed: Nov. 13, 2003

(65) Prior Publication Data

US 2004/0102218 A1    May 27, 2004

(30) Foreign Application Priority Data

Nov. 22, 2002   (JP) .............................. 2002-339754

(51) Int. Cl.
*H04B 1/38* (2006.01)
*H04M 1/00* (2006.01)

(52) U.S. Cl. .................. 455/557; 455/418; 455/558; 709/228

(58) Field of Classification Search .............. 455/414.1, 455/418–420, 556.1, 557–558; 709/228
See application file for complete search history.

(56) References Cited

U.S. PATENT DOCUMENTS

| | | | |
|---|---|---|---|
| 6,223,052 B1 | 4/2001 | Ali Vehmas et al. | 455/551 |
| 6,356,769 B1 | 3/2002 | Vehmas et al. | 455/551 |
| 7,149,805 B2 * | 12/2006 | Bartolome et al. | 709/229 |
| 2002/0174254 A1 | 11/2002 | Kita et al. | |
| 2003/0009541 A1 * | 1/2003 | Sato | 709/220 |
| 2003/0149875 A1 | 8/2003 | Hosaka | |
| 2004/0076136 A1 * | 4/2004 | Beach | 370/338 |
| 2005/0015467 A1 * | 1/2005 | Noda | 709/220 |

FOREIGN PATENT DOCUMENTS

| | | |
|---|---|---|
| CN | 1086367 A | 8/1993 |
| EP | 1 093 272 A2 | 4/2001 |
| JP | 7066747 | 3/1995 |
| JP | 2001186214 | 7/2001 |
| JP | 2001-325166 | 11/2001 |
| JP | 2002091709 | 3/2002 |

OTHER PUBLICATIONS

Chinese Patent Office Communication regarding application No. 10/713,180 dated Oct. 21, 2005 (with English translation).

* cited by examiner

*Primary Examiner*—Vincent P. Harper
*Assistant Examiner*—Jaime M Holliday
(74) *Attorney, Agent, or Firm*—Morgan & Finnegan, LLP

(57) ABSTRACT

A communication method for performing communication with outside by connecting a communication apparatus (e.g., a LAN card) to an electronic apparatus such as a printer. The LAN card is connected to a setting apparatus such as a personal computer (step S301). Then setting information for the electronic apparatus is inputted via the setting apparatus into the LAN card and stored there (steps S302 and S303). The LAN card is connected to the electronic apparatus (step S311), and communication is established based on the setting information in the LAN card. In this manner, a communication function can be easily set even in an apparatus with limited input means such as a printer.

6 Claims, 5 Drawing Sheets

METHOD AND APPARATUS FOR WIRELESS COMMUNICATION BETWEEN DEVICES

FIELD OF THE INVENTION

The present invention relates to information setting processing for wireless LAN communication or the like.

BACKGROUND OF THE INVENTION

FIG. 4 is a flowchart showing the outline of a conventional operation by a computer relating to a wireless LAN compliant with the IEEE 802.11 standard.

First, SSID (Service Set ID) and WEP (Wireless Equivalent Privacy) key necessary for establishment of wireless LAN communication are previously inputted (step S401), and the input information is stored as a setting file on a hard disk (step S402).

Thereafter, when an OS on the computer detects a wireless LAN card (YES at step S403), a wireless LAN driver software is started (step S404). The driver software reads the setting file on the hard disk (step S405), establishes wireless LAN communication based on the contents of the setting file (step S406), and establishes a network (step S407).

When the wireless LAN card is removed (YES at step S408), and when the card is connected to the computer again (YES at step S403), the operation except step S404 is repeated.

In this manner, in a case where a computer or the like is arranged so as to serve a communication function of wireless LAN or the like, it is necessary to previously set parameters necessary for communication. The parameter setting can be easily made by using a keyboard.

In recent years, it is also possible to obtain the necessary parameters via a network and automatically perform setting based on the obtained parameters.

Japanese Patent Application Laid-Open (KOKAI) No. 2001-325166 (US 2002/174254) discloses a method for obtaining information necessary for network connection. More particularly, in a case where a wireless communication apparatus is connected to a computer which lacks a DHCP (Dynamic Host Configuration Protocol) function, the wireless communication apparatus automatically obtains a network number.

Even in a case where the wireless communication apparatus compliant with the IEEE 802.11 standard is connected to a printer or the like, basically a wireless LAN can be realized as long as parameters necessary for communication are set within the apparatus.

However, as input means of the printer or the like is generally limited, an operation for parameter setting is very complicated.

In the above conventional art, the apparatus connected to the wireless communication apparatus is not a printer or the like. Further, there is no disclosure about setting the necessary information in the printer or the like for wireless LAN communication as defined in the IEEE 802.11 standard or the like.

Since the possibility of eavesdropping and unauthorized access is increasing in recent years, it is highly recommended to frequently change the setting of wireless communication function. Accordingly, it is very significant to facilitate setting of communication function in an apparatus with limited input means such as a printer.

SUMMARY OF THE INVENTION

The present invention has its object to facilitate setting of communication function even in an apparatus with limited input means.

According to one aspect of the present invention, the foregoing object is preferably attained by providing a communication method for connecting a communication apparatus to a first apparatus and performing communication, comprising: a registration step of connecting the communication apparatus to a second apparatus, and registering setting information for the first apparatus in the communication apparatus via the second apparatus; and an establishment step of connecting the communication apparatus where the setting information has been registered at the registration step to the first apparatus, and performing communication based on the setting information.

According to another aspect of the present invention, the foregoing object is preferably attained by providing a communication apparatus which performs communication with outside by being connected with a first apparatus, comprising: a memory for storing setting information for the first apparatus transmitted from a second apparatus; and a communication unit to establish communication based on the setting information stored in the memory under the control of the first apparatus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

In the present embodiment, a wireless LAN defined in the IEEE 802.11 standard will be described as a typical example. Accordingly, in the following description, the expression "wireless LAN" means a wireless LAN compliant with the IEEE 802.11 standard. However, the present invention is not limited to this standard.

Figure 1:
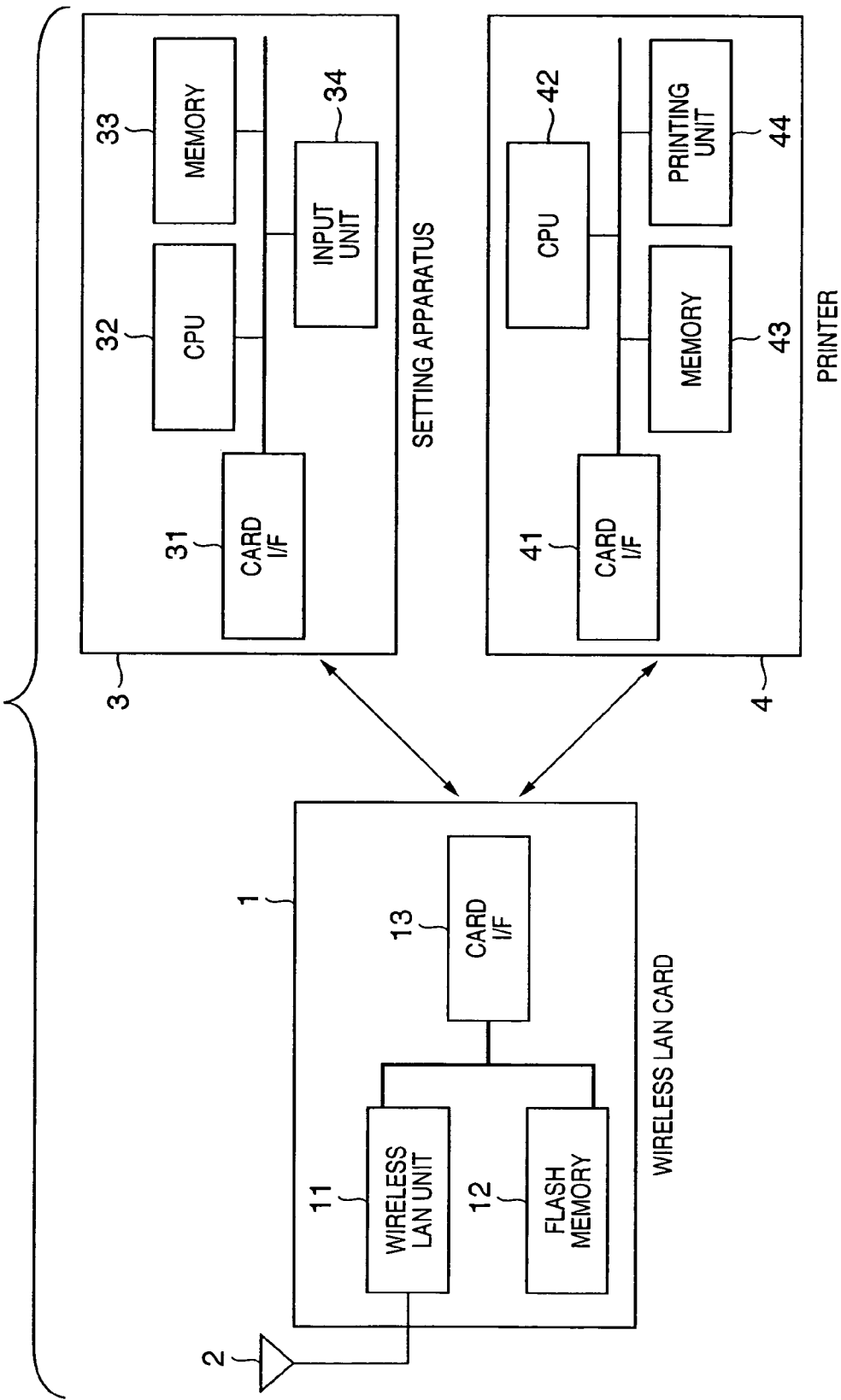
FIG. 1 is a block diagram showing the construction of a wireless LAN card according to a first embodiment of the present invention.

FIG. 1 is a block diagram showing a wireless LAN card as a wireless communication apparatus according to the present embodiment, a personal computer as a setting apparatus, and an apparatus (printer) which can perform wireless LAN communication when connected to the wireless LAN card.

A wireless LAN card 1 is a PCMCIA PC card or the like having an antenna 2 for wireless communication, a wireless LAN unit 11 as wireless communication means, a nonvolatile flash memory 12 capable of holding information necessary for wireless-LAN connection without power supply, and a card I/F 13 as an interface (I/F) for an external apparatus.

As the external apparatus which must be provided with a PC card slot, a personal computer may be used, and further, an electronic apparatus such as a printer with limited input means, which requires very troublesome operation for setting a communication function, may be used.

The external apparatus (personal computer 3, printer 4) connected via the card I/F 13 can refer to the wireless LAN unit 11 and the contents of the flash memory 12 in the wireless communication apparatus 1.

The personal computer (PC) 3 is connected with the wireless LAN card 1 via a card I/F 31, and stores various parameters for wireless LAN communication, inputted by a user's operation from an input unit 34 such as a keyboard, into the flash memory 12 of the wireless LAN card 1. A CPU 32 controls the overall personal computer 3 based on a control program stored in a memory 33.

The printer 4 is connected to the wireless LAN card 1 via a card I/F 41, and realizes wireless LAN communication. A printing unit 44 performs printing based on print data received via the wireless LAN card 1 under the control of a CPU 42. The CPU 42 controls the overall printer 4 based on a control program stored in a memory 43.

Figure 3:
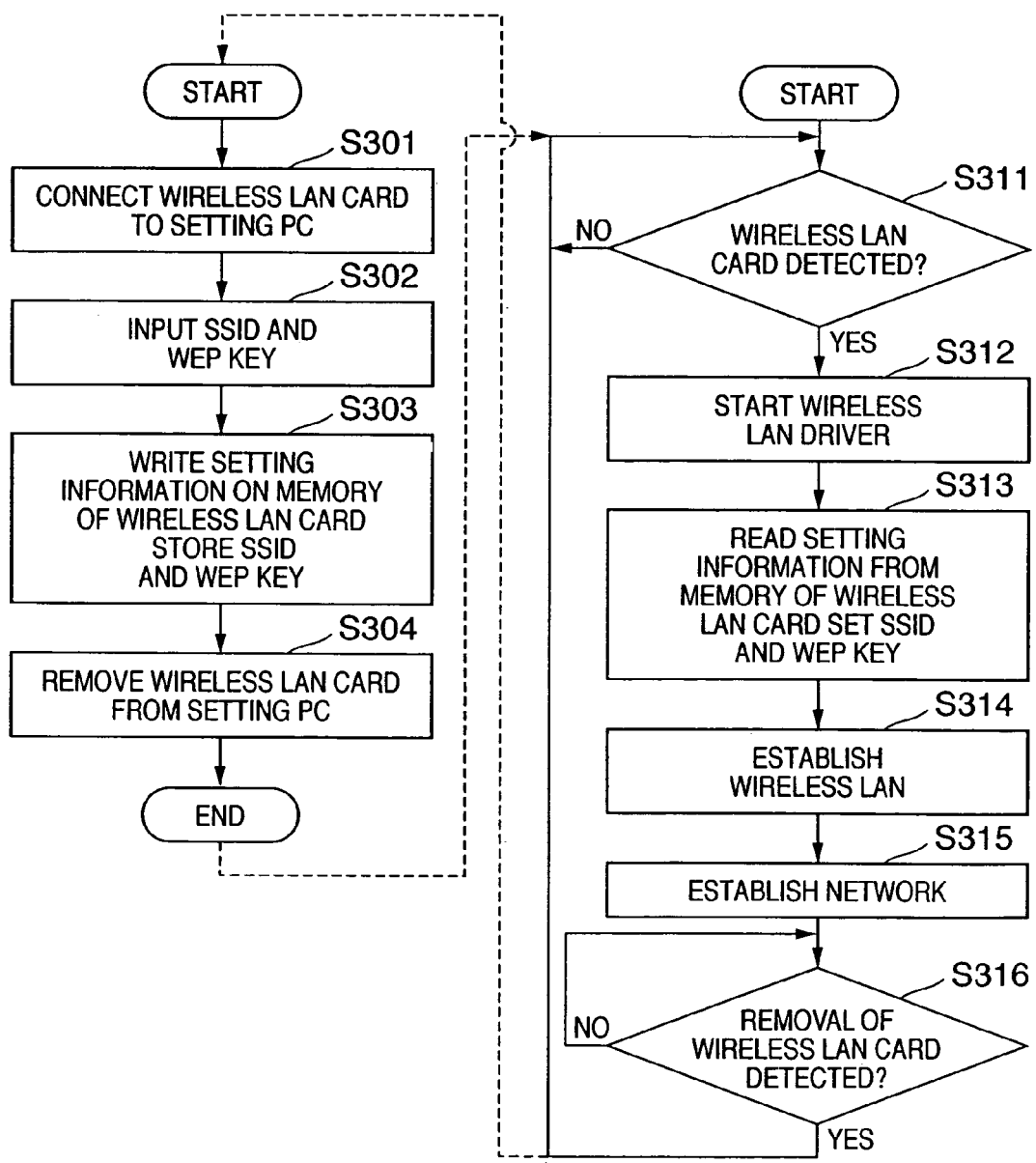
FIG. 3 is a flowchart showing a method for realizing a wireless LAN function in a printer by using the wireless LAN card according to the first embodiment.
Figure 4:
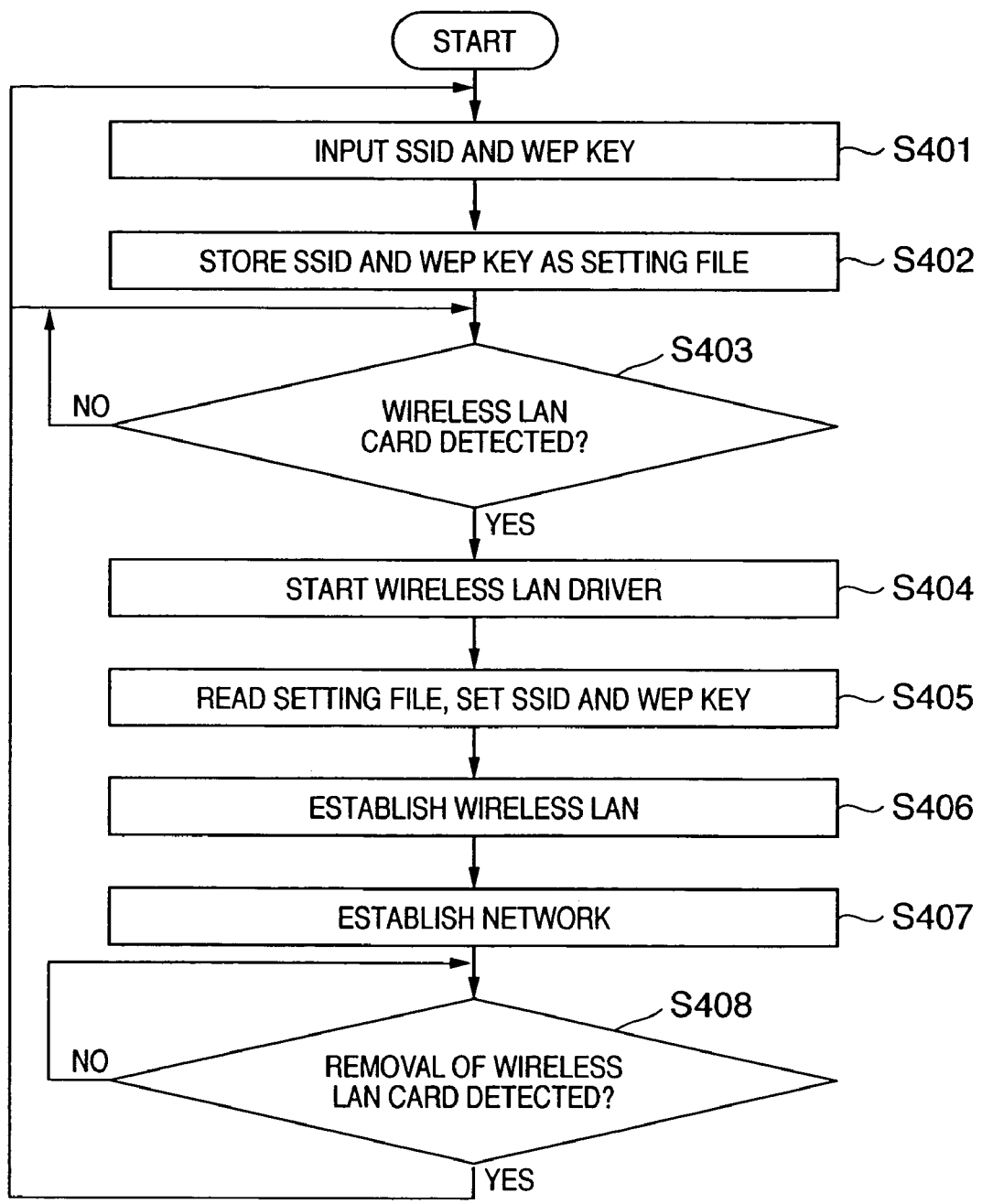
FIG. 4 is a flowchart showing the outline of the conventional operation by the computer relating to the wireless LAN compliant with the IEEE 802.11 standard.

FIG. 3 is a flowchart showing a method for realizing a wireless LAN function by e.g. the printer 4 by using the wireless LAN card 1.

First, the wireless LAN card 1 is connected to an apparatus such as a personal computer (PC) 3 on which setting can be easily made (step S301).

Figure 2:
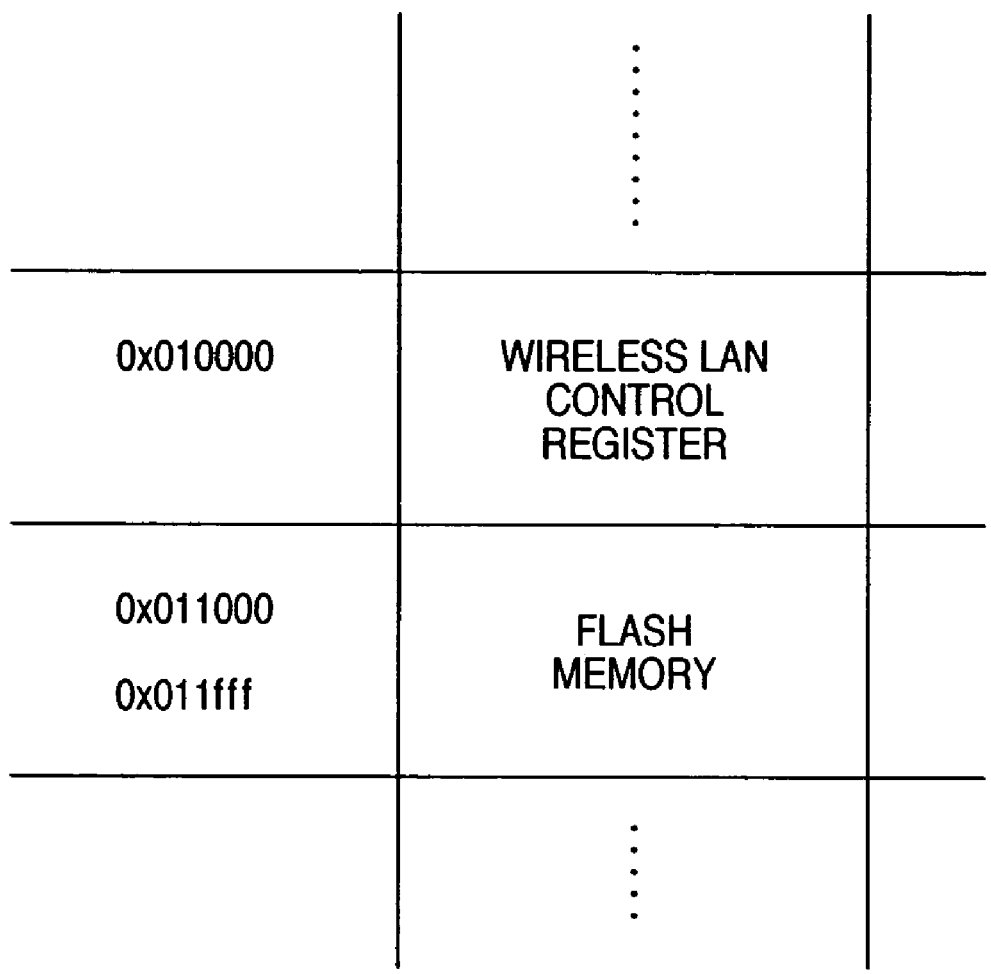
FIG. 2 is an explanatory view of memory space in an apparatus to which the wireless LAN card according to the first embodiment is connected.

When the wireless LAN card 1 is connected to the PC via the card I/Fs 13 and 31, the wireless LAN card 1 is allocated to memory space as shown in FIG. 2 in the PC. Hereinbelow, the PC is used as a setting apparatus.

Next, all the parameters necessary for establishment of wireless LAN communication such as SSID and WEP key used in an apparatus (printer) to be actually used in wireless LAN communication are inputted from an operation unit 34 such as a keyboard of the PC (step S302), and the input parameters are written into the flash memory 12 of the wireless LAN card 1 (step S303).

When the writing has been completed, the wireless LAN card 1 is removed from the PC 3 connected with the LAN card for setting (step S304), and the wireless LAN card 1 is connected to the apparatus (printer 4) to be actually used in wireless LAN communication. As the flash memory 12 is comprised of a nonvolatile memory, the contents are not lost even when it is removed from the PC.

When the wireless LAN card 1 is connected to the apparatus (printer 4) to be actually used in wireless LAN communication via the card I/Fs 13 and 41, the CPU 42 of the printer 4 recognizes the wireless LAN card 1 (YES at step S311), reads driver software to control a wireless communication function of the printer itself from the memory 43 and starts the driver software (step S312).

On the printer 4 side, the wireless LAN card 1 is allocated to memory space as shown in FIG. 2 as in the case of the setting computer. However, the particular address of the wireless LAN card in the printer 4 may be different from that in the setting computer 3.

The driver software to control wireless communication reads the parameters necessary for establishment of wireless LAN communication such as SSID and WEP key from the flash memory 12 of the wireless LAN card 1, and sets them in the wireless LAN unit 11 of the wireless LAN card 1 (step S313). The wireless LAN unit 11 establishes wireless LAN communication using the set wireless LAN parameters (step S314), then establishes a network by a higher-layer protocol (step S315).

When it is necessary to change the setting of the wireless LAN, the wireless LAN card 1 is removed from the apparatus (YES at step S316), and again connected to the PC 3 where setting can be easily made (step S301). On the PC 3, necessary parameter(s) for setting change is inputted (step S302) and stored in the flash memory 12 (step S303).

Thereafter, the wireless LAN card 1 is removed from the setting apparatus (PC 3) (step S304), and connected to the apparatus (printer 4) actually used in the wireless LAN communication. The CPU 42 of the printer 4 recognizes the wireless LAN card 1 (step S311), reads the driver software to control the wireless communication function of the printer itself from the memory 43 and starts the driver software (step S312).

The driver software to control wireless communication reads the parameters necessary for establishment of wireless LAN communication such as SSID and WEP key from the flash memory 12 of the wireless LAN card 1, and sets them in the wireless LAN unit 11 of the wireless LAN card 1 (step S313).

The wireless LAN unit 11 establishes wireless LAN communication using the set wireless LAN parameters (step S314), then establishes a network by a higher-layer protocol (step S315).

As described above, parameters necessary for establishment of wireless LAN can be easily set, and easily changed and used in establishment of wireless LAN communication.

Second Embodiment

In the present embodiment, upon registration of the parameters such SSID and WEP key by the setting apparatus, an ID as identification information of the apparatus (printer), to be connected with the wireless LAN card 1 and to perform wireless communication, is also registered on the wireless LAN card 1, such that the set parameters can be used only on the apparatus of the registered ID.

Figure 5:
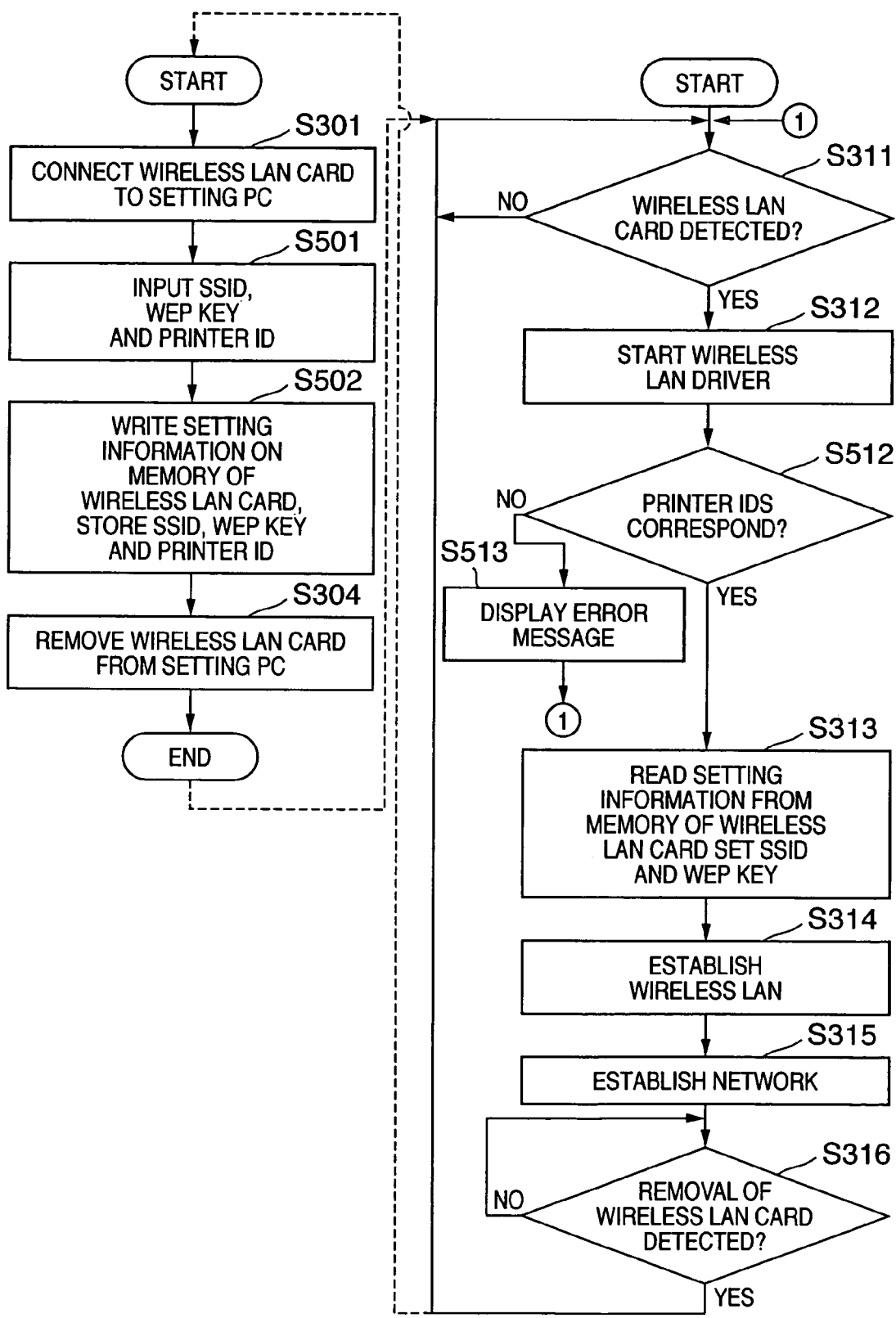
FIG. 5 is a flowchart showing a method for realizing a wireless LAN function in a printer by using the wireless LAN card according to a second embodiment of the present invention.

FIG. 5 is a flowchart showing a method for realizing a wireless LAN function in e.g. the printer 4 using the wireless LAN card 1 according to the present embodiment of the present invention.

First, the wireless LAN card 1 is connected to an apparatus such as a personal computer (PC) 3 on which setting can be easily made (step S301) via the card I/Fs 13 and 31.

When the wireless LAN card 1 is connected to the PC, the wireless LAN card 1 is allocated to memory space as shown in FIG. 2 in the PC. Hereinbelow, the PC is used as a setting apparatus.

Next, the parameters necessary for establishment of wireless LAN communication such as SSID and WEP key used in an apparatus (printer 4) to be actually used in wireless LAN communication and identification information (ID) of the apparatus (printer 4) to use the wireless LAN card 1 are inputted by using the operation unit 34 such as a keyboard of the PC 3 (step S501), and the input parameters and information are written into the flash memory 12 of the wireless LAN card 1 (step S502).

When the writing has been completed, the wireless LAN card 1 is removed from the PC 3 connected with the LAN card for setting (step S304), and the wireless LAN card 1 is connected to the apparatus (printer 4) to be actually used in wireless LAN communication via the card I/Fs 13 and 41. As the flash memory 12 is comprised of a nonvolatile memory, the contents are not lost even when it is removed from the PC.

When the wireless LAN card 1 is connected to the apparatus (printer 4) to be actually used in wireless LAN communication, the CPU 42 of the printer 4 recognizes the wireless LAN card 1 (YES at step S311), reads driver software to control a wireless communication function of the printer itself from the memory 43 and starts the driver software (step S312).

On the printer 4 side, the wireless LAN card 1 is allocated to memory space as shown in FIG. 2 as in the case of the setting computer. However, the particular address of the wireless LAN card in the printer 4 may be different from that in the setting computer 3.

The driver software to control wireless communication reads the identification information of the printer from the flash memory 12 of the wireless LAN card 1 and compares it with identification information set in the apparatus itself (step S512). As a result, if the read identification information and the identification information previously-set in the apparatus itself are different, an error message is displayed on a display unit. Then the process returns to step S311.

If the read identification information and the previously-set identification information correspond with each other, the driver software reads the parameters necessary for establishment of wireless LAN communication such as SSID and WEP key from the flash memory 12 of the wireless LAN card 1, and sets them in the wireless LAN unit 11 of the wireless LAN card 1 (step S313). The wireless LAN unit 11 establishes wireless LAN communication using the set wireless LAN parameters (step S314), then establishes a network by a higher-layer protocol (step S315).

As in the case of the first embodiment, when it is necessary to change the setting of the wireless LAN, the wireless LAN card 1 is removed from the apparatus (YES at step S316), and again connected to the PC 3 where setting can be easily made.

Note that as the setting on the setting apparatus, parameters for plural apparatuses can be set. In this case, parameters are set for each identification information of plural apparatuses at step S501, and these settings are stored at step S502.

At step S512, it is determined whether or not the plural identification information stored on the wireless LAN card 1 include identification information of the apparatus itself (printer 4). If the identification information of the apparatus itself is included, the parameters corresponding to the identification information are read and then set (step S313). In this manner, as apparatus settings for each of environments of use are previously set by using the setting apparatus, when the wireless LAN card 1 is brought into one environment and connected to an apparatus used in the environment, parameters corresponding to the environment and the apparatus can be automatically read and utilized.

The present invention is not limited to the above embodiments and various changes and modifications can be made within the spirit and scope of the present invention. Therefore, to appraise the public of the scope of the present invention, the following claims are made.

What is claimed is:

1. A communication method for allowing a printing apparatus connected to a wireless LAN adapter having a wireless LAN communication unit and a memory, to perform wireless LAN communication via the wireless LAN adapter, said communication method comprising:

a registration step of causing an external computer apparatus to register Service Set ID and printer ID of a target printer to use the wireless LAN adapter, into the memory of the wireless LAN adapter, in a case that the external computer apparatus is connected to the wireless LAN adapter, wherein the Service Set ID defines wireless LAN communication of the target printer via the wireless LAN adapter;

a first reading step of causing the printing apparatus to read the printer ID from the memory of the wireless LAN adapter, in a case that the wireless LAN adapter in which the printer ID has been registered in said registration step is connected to the printing apparatus;

a comparison step of comparing the printer ID read in said first reading step with printer ID of the printing apparatus preset in the printing apparatus;

a notification step of notifying a user of an error, in a case that the printer ID of the printing apparatus does not match with the printer ID read in said first reading step, wherein the Service Set ID is not read from the memory of the wireless LAN adapter;

a second reading step of causing the printing apparatus to read the Service Set ID from the memory of the wireless LAN adapter from which the printer ID is read in said first reading step, in a case that the printer ID of the printing apparatus matches with the printer ID read in said first reading step;

a setting step of causing the printing apparatus to set the Service Set ID read in said second reading step in the wireless LAN communication unit of the wireless LAN adapter from which the Service Set ID is read in said second reading step; and a communication step of causing the wireless LAN communication unit of the wireless LAN adapter in which the Service Set ID is set in said setting step, to perform the wireless LAN communication, using the Service Set ID set in said setting step.

2. The communication method according to claim 1, wherein in said registration step, the external computer apparatus further registers an encryption key for encryption communication by the printing apparatus in the memory of the wireless LAN adapter.

3. The communication method according to claim 1, wherein said second reading step causes the printing apparatus to read the Service Set ID associated with the printer ID of the printing apparatus from the memory.

4. A printing apparatus which is capable of performing wireless LAN communication by being connected with a wireless LAN adapter having a wireless LAN communication unit and a memory, said printing apparatus comprising:

a detection unit configured to detect a connection with the wireless LAN adapter;

a first reading unit configured to read printer ID from the memory of the wireless LAN adapter, wherein the printer ID is registered as a printer identifier of a target printer to use the wireless LAN adapter in the memory of the wireless LAN adapter by an external computer apparatus, in a case that said detection unit detects that the wireless LAN adapter is connected to the printing apparatus;

a comparison unit configured to compare the printer ID read by said first reading unit with printer ID of the printing apparatus preset in the printing apparatus;

a notification unit configured to notify a user of an error, in a case that the printer ID of the printing apparatus does not match with the printer ID read by said first reading unit, wherein the Service Set ID is not read from memory of the wireless LAN adapter;

a second reading unit configured to read the Service Set ID from the memory of the wireless LAN adapter from which the printer ID is read by said first reading unit, in a case that the printer ID of the printing apparatus matches with the printer ID read by said first reading unit, wherein the Service Set ID is registered in the memory by the external computer apparatus;

a setting unit configured to set the Service Set ID read by said second reading unit in the wireless LAN communication unit of the wireless LAN adapter from which the Service Set ID is read by said second reading unit as wireless communication parameters for which the wireless LAN communication unit performs the wireless LAN communication; and a wireless LAN communication unit in which the Service Set ID is set in said setting unit configured to perform the wireless LAN communication using the Service Set ID set in the wireless LAN communication unit.

5. The printing apparatus according to claim 4, wherein said second reading unit reads the Service Set ID as well as an encryption key for encryption communication from the memory, wherein the encryption key is registered in the memory by the external computer apparatus, and wherein said setting unit sets the Service Set ID as well as the encryption key read by said second reading unit in the wireless LAN communication unit of the wireless LAN adapter.

6. A control method of a printing apparatus which is capable of performing wireless LAN communication by being connected with a wireless LAN adapter, said control method comprising:

a detection step of detecting a connection with the wireless LAN adapter;

a first reading step of reading printer ID from a memory of the wireless LAN adapter, wherein the printer ID is registered as a printer identifier of a target printer to use the wireless LAN adapter in the memory of the wireless LAN adapter by an external computer apparatus in a case that said detection step detects that the wireless LAN adapter is connected to the printing apparatus;

a comparison step of comparing the printer ID read in said first reading step with printer ID of the printing apparatus preset in the printing apparatus;

a notification step of notifying a user of an error, in a case that the printer ID of the printing apparatus does not match with the printer ID read in said first reading step, wherein the Service Set ID is not read from the memory of the wireless LAN adapter;

a second reading step of reading the Service Set ID from the memory of the wireless LAN adapter from which the printer ID is read in said first reading step, in a case that the printer ID of the printing apparatus matches with the printer ID read in said first reading step, wherein the Service Set ID is registered in the memory by the external computer apparatus;

a setting step of setting the Service Set ID read in said second reading step in the wireless LAN communication unit of the wireless LAN adapter from which the Service Set ID is read in said second reading step as wireless communication parameters for which the wireless LAN communication unit performs the wireless LAN communication; and a communication step of performing wireless LAN communication by the wireless LAN adapter in which the Service Set ID is set in said setting step using the Service Set ID set in the wireless LAN communication unit.

* * * * *